July 28, 1964 P. J. LEESON 3,142,154
VARIABLE LIMIT FUEL FLOW REGULATOR FOR PRIME MOVERS
Filed Dec. 19, 1960 5 Sheets-Sheet 1

INVENTOR
Plato J. Leeson
By Wolfe, Hubbard, Voit & Osann
ATTORNEY

INVENTOR
Plato J. Leeson
By Wolfe, Hubbard, Voit & Osann
ATTORNEYS

United States Patent Office 3,142,154
Patented July 28, 1964

3,142,154
VARIABLE LIMIT FUEL FLOW REGULATOR
FOR PRIME MOVERS
Plato J. Leeson, Rockford, Ill., assignor to Woodward Governor Company, Rockford, Ill., a corporation of Illinois
Filed Dec. 19, 1960, Ser. No. 76,823
8 Claims. (Cl. 60—39.28)

This invention relates to the control of the flow of fuel to a prime mover such as a gas turbine operating under varying conditions such as temperature and altitude which necessitate placing certain limits on the fuel flow at various times. In certain of its aspects, the invention relates to and constitutes an improvement on a control of the hydraulic type forming the subject matter of the application of Harland C. Plummer, Serial No. 657,291, filed May 6, 1957. In this control, hereinafter referred to as the former control, the fuel flow to the prime mover is regulated by a fluid servo variably energized during steady state operation solely by an all speed hydraulic governor whose action is limited or over-ridden hydraulically at proper times by the action of an auxiliary valve positioned in accordance with the difference between the actual flow of fuel to the prime mover and a permissible limit computed from the measurement of at least one parameter such as compressor discharge pressure which affects the operation of the prime mover.

The general object is to simplify and reduce the size of the control above described, render the same more versatile, and increase the accuracy of the fuel metering under the widely varying conditions encountered in service use on prime movers such as modern aircraft gas turbines.

A more detailed object is to regulate the energization of the fuel valve servo by combining the speed governor and limit control valves in a novel series relation.

Another object is to achieve structural simplification by biasing of the various hydraulic servos in a novel manner.

A further object is to provide for continuing the operation of the regulator in a novel manner after manual shutdown of the fuel flow.

Other objects and advantages of the invention will become apparent from the following detailed description taken in connection with the accompanying drawings, in which.

*Fuel Flow Control Valves*

Figure 3:
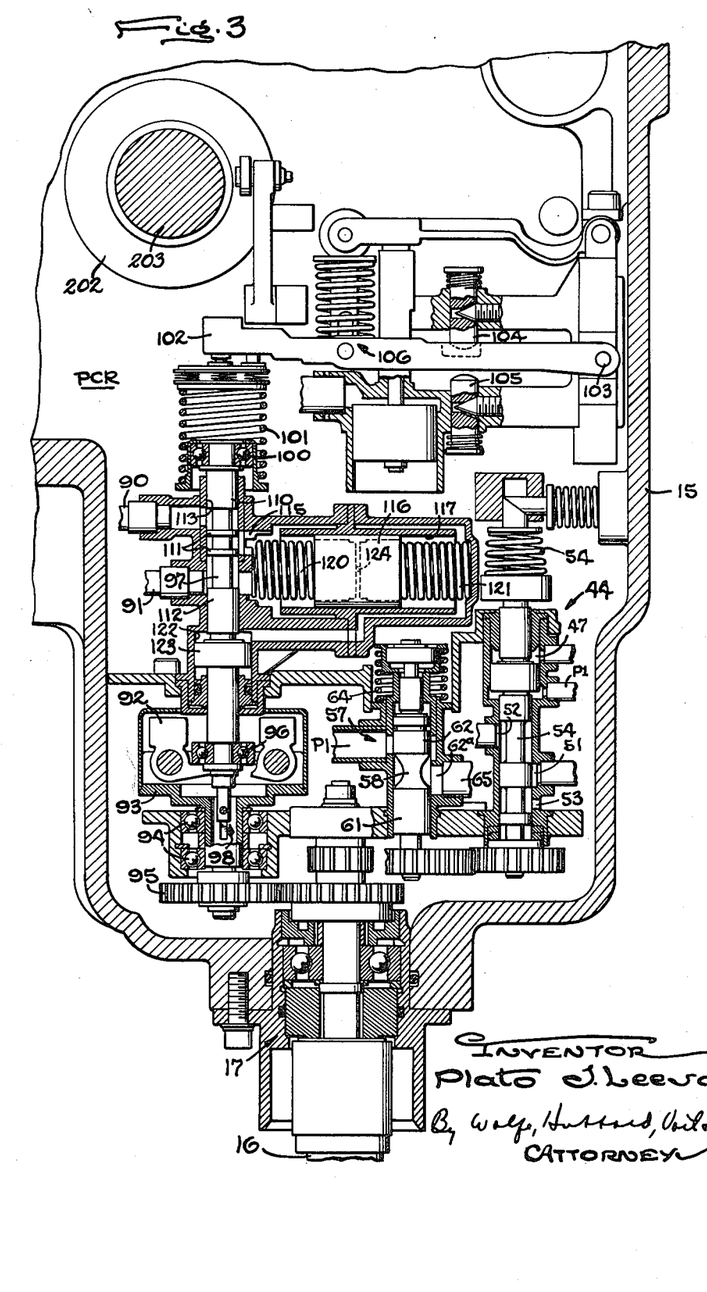

In the form shown in the drawings for purposes of illustration, the improved regulator is especially adapted for use in adjusting the opening of a valve 10 to meter the flow of liquid fuel under pressure to a passage 11 leading to the burners of a gas turbine 12 driving the usual rotary compressor 13. The valve and the parts governing its operation are designed to fit compactly within a fluid filled casing 15 indicated by the dotted enclosure in FIG. 4. The casing is clamped to the exterior of the prime mover whose main shaft is suitably coupled to a shaft 16 extending into the regulator casing 15 through a sealed bearing structure 17 (FIG. 3). Another extension 18 of the turbine shaft is coupled to the main pump 19 which delivers fuel at a high pressure P1 usually about 400–1200 p.s.i. to a pipe 20 extending through the wall of the casing 15 and communicating with a passage 21 leading to the inlet of the main valve 10. Fuel from a storage tank 22 is supplied at relatively low pressure Pb, usually 37–110 p.s.i., to the inlet of the main pump by the usual so-called boost pump 23 driven by the turbine or an external power source.

Herein, the valve 10 and its actuating servo 24 comprise pistons 25 and 26 of equal size fixed to and axially spaced along a rod 27 and slidable in a cylinder 28 which is left open at its head end thus exposing the full diameter of the valve piston 26 to a reference and biasing pressure maintained within the casing 15. The valve piston 26 uncovers varying amounts of a port 30 according to position of the servo piston 25 as determined by the changing pressure in the rod end of the cylinder 28.

A manually controllable shut-off valve 31 is interposed in the passage 11 between the main valve and the burners of the prime mover. As shown, this valve includes a disk 32 mounted yieldably on a rod 32a and movable toward and away from a seat 33 by manipulating a lever 34 suitably coupled to a shaft 35 which is extended through the casing wall and joined to the valve rod as by a rack and pinion 36. The cylinder of the valve 31 is long enough to permit substantial movement of the disk beyond the fully open position of the valve.

*Maintaining Constant Metering Head*

As in the former control, a constant pressure drop or metering head is maintained across the main valve 10 in order that the position of the servo piston 25 will at all times constitute an accurate indication of the prevailing rate of fuel flow. This is accomplished by an automatic by-pass valve 37 comprising a piston 38 slidable in a cylinder 40 and cooperating with a port 41 at the end of a passage 42 connected with the discharge side of the boost pump 23 and constituting the low pressure or return line of the present hydraulic system.

The piston 38 is biased in the valve-closing direction by a spring 43 and is exposed on the opposite side to the main pump discharge pressure P1 in the passage 21 and therefore to the pressure on the inlet side of the main valve 10. The pressure in the spring chamber is varied with pressure changes on the outlet side of the fuel valve by the action of valve 44 comprising a plunger 45 slidable in a cylinder 46 and communicating at one end with the supply line 21 and at the other end with a passage 47 which leads to the outlet side of the main valve. A normally open valve 48 later to be described is interposed in the pasasge 47.

Intermediate its ends, the plunger 45 carries a land 50 cooperating with a port 51 leading to the spring end of the by-pass valve cylinder 40. On opposite sides of the land, the cylinder 46 communicates at 52 with the high pressure line 21 and at 53 with the interior of the case 15 which is maintained at a lower reference pressure Pcr. A spring 54 scaled according to the metering head to be maintained urges the plunger 45 in a direction to open the valve 44 thus supplementing the main valve outlet pressure P2 acting on the plunger end 55. The other end 56 is subjected to the pump discharge P1. The arrangement is such that as the opposing forces on opposite ends 55, 56 of the plunger 45 become unbalanced, the valve 44 is opened or closed as the case may be to correspondingly change the force balance on the by-pass valve piston 38 and thereby increase or restrict the escape of fuel through the port 41. The desired constant pressure drop is thus maintained across the main fuel valve 10.

*Regulator for Deriving Servo Actuating Pressures*

*Control pressure Pc.*—In the present instance, the fuel pressurized by the pump 19 is utilized to actuate the various hydraulic servos by which the energization of the main valve servo is regulated. The boost pump 23 provides a suitable low pressure $Pb$ source and for this purpose a branch of its discharge line is extended through the wall of the casing 15 and communicates with a passage 42 which is closed and does not communicate with the space within the casing.

A high pressure source $Pc$, preferably about 200–290 p.s.i., for actuating the servos is derived from the main pump discharge line 21 and is produced by a regulating valve 57. The latter comprises a plunger 58 slidable in a cylinder 60 which communicates with the high pressure line 21 between lands 61 and 62 on the plunger. The land 62 is exposed at 63 to the pressure $Pcr$ within the case 15 and is urged inwardly by a compression spring 64 scaled according to the desired value of $Pc$. The other land 61 cooperates with a port $62^a$ to form the valve 57 regulating the flow of fluid $P1$ to a passage 65 to maintain therein the desired pressure $Pc$ which is exerted on the outer end of the land 61. With this arrangement, the plunger is moved back and forth to maintain a balance between the forces acting on its opposite ends and to thereby regulate the flow of fluid at $P1$ to the passage 65 and thereby maintain the desired value of $Pc$ as determined by the spring 64 and the reference pressure $Pcr$.

*Reference or case pressure Pcr.*—In one of its aspects, the invention contemplates maintenance of the space around the operating parts and within the casing 15 at a pressure $Pcr$, 125–200 p.s.i., intermediate the low boost pressure $Pb$ and the high control pressure $Pc$ and utilization of such pressure to bias several of the hydraulic servos in one direction. This pressure $Pcr$ is obtained by an automatic regulating valve 66 comprising a plunger 67 slidable in a cylinder 68 which communicates between lands 70, 71 with the control pressure line 65 at $Pc$. The outer end of the land 71 is exposed to the pressure $Pb$ in the line 42 and is urged inwardly by a compression spring 72 scaled according to the desired value of $Pcr$. The other land 70 cooperates with a port 73 to form the valve 66 regulating the flow of fluid to a passage 74 to maintain therein the desired pressure $Pcr$ which is exerted on the outer end of the plunger land 75. With this arrangement, the plunger 67 is moved back and forth to maintain a balance between the forces acting on opposite ends of the plunger and thereby regulate the flow of fluid at the pressure $Pc$ to the passage 74 to maintain the desired value of $Pcr$ therein and in all other space around the operating parts and piping within the casing 15.

It will be apparent that upon starting of the pump 19, the regulating valves 57 and 66 will be open and as the pressure $P1$ builds up above the pressure $Pc$, the valves will be closed progressively until both of the desired pressures $Pc$ and $Pcr$ are attained in the space within the casing 15.

*Reference pressure Pm.*—To achieve optimum accuracy in the measurement of certain of the engine operating parameters, it is preferred to employ still another reference pressure at an accurately maintained value $Pm$, for example 400 p.s.i.a. This pressure source is also derived from the discharge pressure $P1$ of the fuel pump 19 by the action of a regulating valve 76 comprising a plunger 77 slidable in a cylinder 78 which communicates with the $P1$ pressure line between lands 80 and 81 on the plunger. The land 80 is exposed to a reference pressure $Pvr$ later to be described and is urged inwardly by a compression spring 82 scaled according to the desired value at which $Pm$ is to be maintained. The other land 81 cooperates with a port 83 to form a valve regulating the flow of fluid to a passage 84 to maintain therein the desired pressure $Pm$ which is exerted on the outer end of the plunger land 81. With this arrangement, the plunger 77 is moved back and forth to maintain a balance between the forces acting on its opposite ends to thereby regulate the flow of fluid at the pressure $P1$ and maintain the desired value of $Pm$ in the passage 84 as determined by the force of the spring 82.

*The Invention in General*

As in the regulator disclosed in the aforesaid application, the energization of the main servo 24 is controlled during steady state operation of the prime mover by an all speed governor 85 which is disabled upon the occurrence of certain ambient conditions or a combination thereof affecting the operation of the prime mover and, under extreme conditions that may be encountered, is actually over-ridden. In general, the governor includes a valve 86 which regulates the flow of pressure fluid to and from the servo 24 and the limiting and over-riding actions are produced by a valve 87 whose movable member 88 is positioned in accordance with the difference between the actual flow of fuel through the main valve 10 as determined by the main governor 85 and a theoretically correct or permissible flow computed from measurements of the prevailing ambient parameters which affect the operation of the prime mover.

The present invention constitutes an improvement on prior systems of this character and is characterized by a novel and simplified arrangement of the governor valve 86 and the limit control valve 87 which enables a computed limit of maximum or minimum fuel flow to be imposed at proper times while avoiding fluid leakage from the main servo and the loss of extreme precision in the regulation of the speed of the prime mover during steady state operation. More particularly, the limit valve 87 is located in series with and in advance of the governor valve 86 and acts during steady state operation to connect the high ($Pc$) and low ($Pb$) pressure lines 65 and 42 to passages 90 and 91 leading to the governor valve, to interrupt such flow when the actual fuel flow reaches the permissible limit computed from prevailing engine parameters, or to actually reverse the flow and over-ride the governor when such limit is exceeded.

*Main Speed Governor*

As in the former control, the governor is of the construction shown in Patent No. 2,478,753 which may be referred to for further details. The speed senser of the governor comprises a pair of flyweights 92 pivoted on a ball-head 93 which is journaled in a bearing 94 (FIG. 3) and carries a gear 95 meshing with a gear on the drive shaft 16. Inwardly projecting toes on the flyweight act through a bearing 96 to axially position a stem 97 spline coupled at 98 to the ball-head.

The upper end of the stem bears against the inner race of a bearing 100 whose outer race abuts one end of a compression type speeder spring 101 abutting at its other end against a lever 102 fulcrumed at 103 and movable within a range determined by adjustable stops 104 and 105. Herein the lever is coupled through a spring loaded lost motion connection 106 with the follower 107 of a cam 108 fast on the shaft 35. By turning the throttle 34 and the shaft 35, the stressing of the spring and the speed setting of the governor may be varied as desired.

Figure 4:
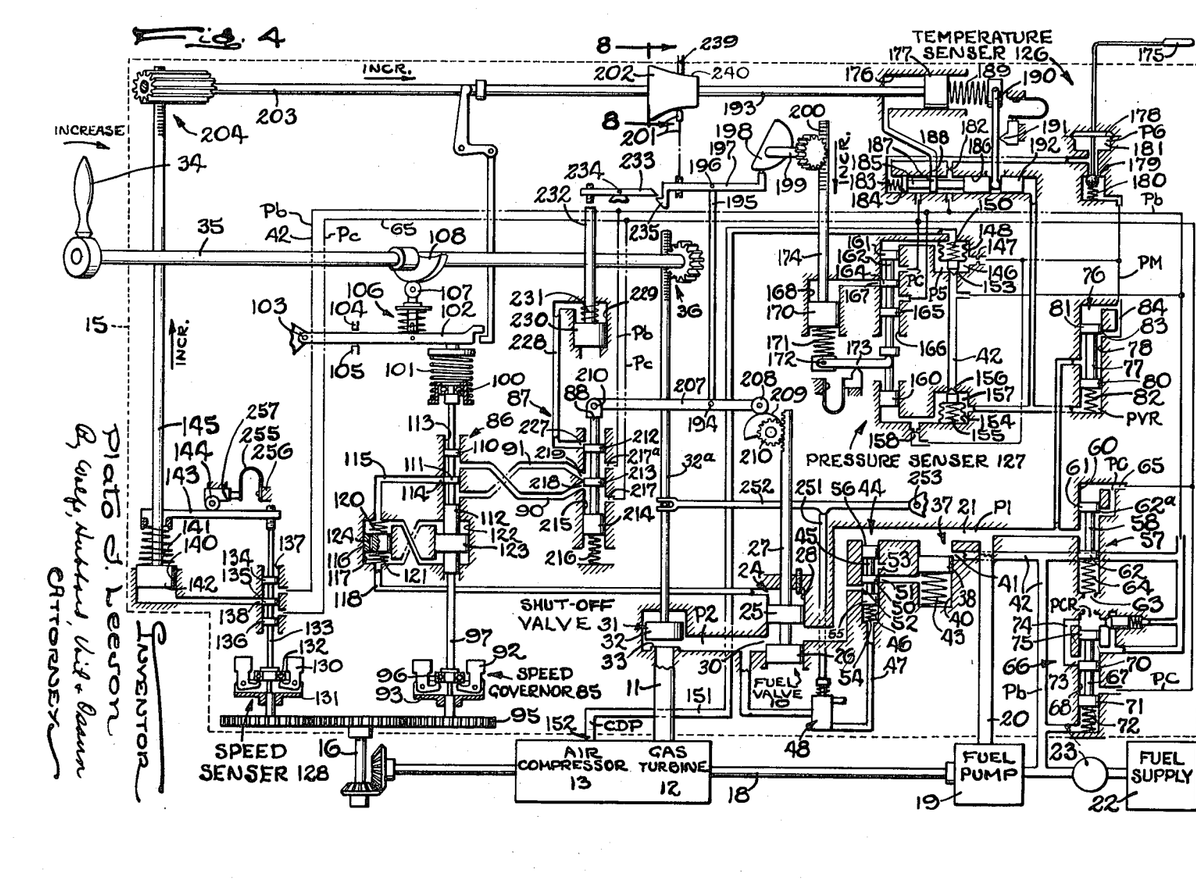
FIG. 4 is a schematic view and hydraulic circuit diagram of the improved regulator embodying the novel features of the present invention.

The governor valve 86 comprises lands 110, 111 and 112 axially spaced along the stem 97 and slidable in a cylinder 113 communicating between the lands 111 and 112 with the normally low pressure passage 91 and between the lands 110 and 111 with the normally high pressure passage 90. The land 111 cooperates with a port 114 to form the governor valve 86 for blocking the port when the flyball force balances the speed spring force as shown in FIGS. 3 and 4, for admitting fluid at the high pressure Pc to a passage 115 when the stem 97 is lowered in response to a detected fall in speed, and for releasing fluid from the passage when the turbine speed increases above the governor speed setting and raises the land 111 above the centered or on-speed position.

Changes in the fluid pressure in the passage 115 as controlled by the governor valve 86 are communicated to the cylinder 28 of the main fuel valve servo 24. Herein, this is accomplished through the medium of a piston 116 slidable in a cylinder 117 connected at opposite ends to the passage 115 and a passage 118 leading to the rod end of the servo cylinder 28. The piston 116 is urged toward a centered position by oppositely acting compression springs 120, 121.

This method of utilizing the governor valve to vary the energization of the servo 24 facilitates producing isochronous or constant speed operation of the turbine. For this purpose, opposite ends of the cylinder 117 are cross-connected with opposite ends of a cylinder 122 in which a piston 123 slides. This piston is fast on the land 112 of the pilot valve plunger 97 which receives a so-called compensating force following each speed change thus causing a change in the position of the piston 123 and a consequent change in the compression of one of the springs 120, 121. Then, as fully described in the aforesaid patent, this force or pressure differential is dissipated gradually by leakage of the fluid between opposite ends of the cylinder 117 until the pressures therein are again equalized. In the present instance, such leakage is through a restricted passage 124 extending axially through the piston 116.

In operation, when the land 111 in response to a speed decrease below the prevailing speed setting of the governor is lowered from its neutral position opening the port 114, fluid at Pc will flow into the passage 115. The pressure increase moves the piston 116 downwardly compressing the spring 121 and forcing fluid out of the remote end of the cylinder 117 into the servo cylinder 28. The servo piston 26 is thus moved downwardly in the fuel-increasing direction against constant fluid pressure on its lower end. Conversely, a detected rise in speed causes the valve land 111 to be raised above the port 114 allowing fluid to escape to the low pressure line 91 thus decreasing the pressure in the passage 115. This allows the piston 116 to move under the high pressure existing in the servo cylinder 28 thereby compressing the spring 120 and allowing the servo piston to move upwardly in the fuel-decreasing direction.

In response to either of the correcting actions above described, a pressure difference develops between the valve controlled passage 115 and the servo passage 118, the differentials being in opposite senses depending on whether the speed rises above or falls below the governor setting. The pressure differential is always in a direction to restore the valve stem 97 to its neutral position. This drooping characteristic is then dissipated gradually by fluid leakage through the restriction 124 until normal speed has been restored under the changed load. The action results in the fuel valve 24 taking a new position without a permanent change in the engine speed.

*Fuel Limit Control*

Figure 9:
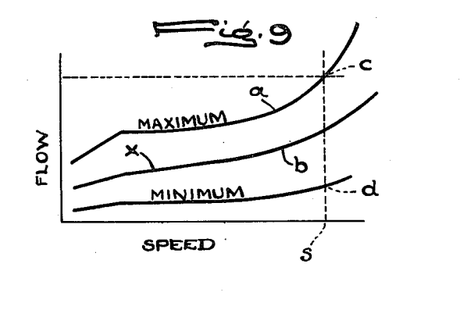
FIG. 9 shows typical operating curves.

As in the former control, provision is made for limiting the fuel flow to spaced maximum and minimum values for each different combination of engine speed and air density as illustrated by the exemplary and simplified curves a and b in FIG. 9. Thus, for any given engine speed s, the maximum flow of fuel is limited to a rate c and the minimum flow to the rate d. In the steady state range between a and b, the flow rate is regulated by the primary or governor control so as to maintain the turbine speed constant under different loads at the speed s. Accurate control of a gas turbine over such a wide range by the governor alone is made possible by the isochronous character of the governor which compensates automatically for the many variable and transient conditions encountered in the regulation of the speed of a gas turbine.

Such a schedule of permissible fuel flow limits is determined by the characteristics of the prime mover to be controlled and is computed from measurements of one or more parameters which affect the operation of the prime mover. Herein these parameters are air temperature at the inlet of the compressor 13 as measured by a senser 126, the pressure of the air as discharged from the outlet of the compressor as measured by a senser 127, and turbine speed as measured by a separate senser or tachometer 128. The three parameters thus measured continuously are converted into corresponding motions which are combined to ascertain the permissible range through which the fuel flow may be varied by the primary governor control before the limit control becomes effective.

*Speed Senser*

As herein shown, this device includes flyweights 130 fulcrumed on a ball-head 131 and coupled through suitable gearing with the shaft 16 that drives the main governor. Toes on the flyweights bear upwardly against the outer race of a ball bearing 132 whose inner race is fast on a stem 133 spline coupled to the ball-head. Axially spaced lands 134, 135 and 136 fast on the stem are slidable in a cylinder 137 open at opposite ends to the case pressure Pcr. The lines 65 and 42 at the pressures Pc and Pb respectively communicate with the cylinder between the lower and upper pairs of lands.

The intermediate land covers a port 138 when in the centered position shown in FIG. 4 but uncovers part of the port to admit fluid at pressure Pc to or release fluid to the low pressure line from a passage leading to a servo cylinder 140 when the flyweight speed is respectively below and above the speed setting of the senser as determined by the stressing of a compression spring 141. The latter abuts at one end against a piston 142 slidable in the cylinder and at its other end with one end of a feed back lever 143 fulcrumed intermediate its end against the valve stem 133.

With the feed back lever thus connected, the valve 135, 138 is operated by the flyweights 130 to vary the energization of the servo 140, 142 and move the piston thereof progressively back and forth to correspond to changes in the engine speed. Thus, the rod 145 of the piston always assumes a position precisely proportional to the prevailing speed of the turbine.

*Pressure Senser*

The device 127 shown herein includes a chamber 146 supplied continuously through a restriction 147 with fluid at the pressure Pm and communicating with one side of a bellows 148 loaded by a spring 150 and exposed on its other side to the pressure CDP to be measured. Thus, the interior of the bellows communicates with a passage 151 leading out through a wall of the casing 15 and to a tube 152 terminating within the outlet of the compressor 13. A valve 153 actuated by the diaphragm is thus operated to regulate the escape of fluid from the chamber 146 so as to maintain P5 at a value corresponding to CDP.

In a similar way, an evacuated bellows 154 loaded by a spring 155 operates a valve 156 to control the release of pressure fluid from a chamber 157 supplied through a restriction 158 with fluid at the reference chamber Pm. Thus the chamber 157 is accurately maintained at a constant absolute reference pressure Pvr determined by the spring 155, this pressure being 120 p.s.i.a. in the present instance. Fluid escaping through the valves 153 and 156 is returned to the low pressure P$b$ passage 42.

The pressures P$vr$ and P5 in the chambers 146 and 157 are applied to pistons 160 and 161 at opposite ends of a plunger 162 carrying axially spaced lands 164 and 165 which slide in a cylinder 166. The latter communicates between two of the lands with the control pressure P$c$ supply line 65 and between the other two lands with the low pressure P$b$ line 42. The intermediate land cooperates with a port 167 to form a valve controlling the admission of fluid at P$c$ to or the release of fluid from the rod end of a cylinder 168 in which a piston 170 slides to form a servo biased in the pressure decreasing direction by a spring 171 acting in compression between the piston and one end of a feed back lever 172 fulcrumed intermediate its ends at 173 and bearing on the plunger 162.

At equilibrium, the land 164 will be centered on the port 167 as shown in FIG. 4 and the pressure P5 on the piston 161 will balance the pressure P$vr$ on the piston 160 combined with the restoring force exerted by the spring 171. In response to a decrease in CDP, the pressure P5 will fall correspondingly thus opening the valve 153 ot release fluid from the cylinder and move the piston upwardly until the reduced force of the spring 171 on the plunger 162 recenters the later. Conversely, the valve 153 admits pressure fluid to the chamber 146 when the plunger is moved downwardly in response to an increase CDP, the piston being moved downwardly until the increased restoring force on the plunger is sufficient to recenter the land 164 on the port 167. As a result, the rod 174 of the piston 170 moves back and forth with changes in CDP and always occupies a position corresponding precisely to the prevailing absolute value of such pressure.

Temperature Senser

The temperature senser 126 operates in response to temperature changes of a bulb 175 to vary the energization of a hydraulic servo 176 and move the piston 177 thereof back and forth so as to maintain the piston in a position at all times corresponding precisely to the prevailing temperature of the air supplied to the engine through the compressor inlet. The bulb which is filled with gas communicates with one side of a diaphragm 178 coupled to the stem of a pilot valve 179 loaded by a spring 180. Fluid at the high reference pressure P$m$ is supplied to the valve and allowed to flow to a chamber 181 when the temperature of the bulb 175 and the gas pressure on the diaphragm 178 increase enough to open the valve 179. The latter is thus operated to regulate the pressure in the chamber 181 and maintain the same at a value P6 which corresponds at all times to the temperature of the bulb. Since the chamber is connected to the low pressure P$b$ line hrough a restriction 182, the valve 179 remains open continuously thus providing a continuous flow of fluid through the chamber.

The regulated pressure P6 supplemented by a compression spring 183 is applied to a piston 184 at one end of a plunger 185 slidable in a cylinder 186 and carrying a land 187 which cooperates with a port 188 to form the valve. When disposed on opposite sides of the centered position shown in FIG. 4, this valve admits fluid at high pressure P$c$ to or releases fluid from the rod end of the Servo 176. A spring 189 acts in compression between the servo piston 177 and one end of a restoring lever 190 fulcrumed at 191 and disposed at its other end between flanges on the plunger 185.

A piston 192 at the other end of the plunger is subjected to the accurately regulated reference pressure P$vr$ derived as above described from the pressure senser. Thus, when the pressure P6 plus the force of the spring 183 equal the pressure P$vr$ acting on the piston 192 plus the restoring force of the spring 189, the plunger will be positioned to center the land 187 on the port 188. In response to a rise in the bulb temperature and the resulting increase in P6, the plunger 185 is shifted to the right thus admitting P$c$ to the servo 176. The piston 177 thus moves to the right until the increase in the force of the restoring spring 189 rebalances the opposing forces acting on the plunger. Conversely, in response to unbalance of the forces in the opposite direction, the valve 187, 188 is opened to connect the servo to the low pressure line until the plunger has been rebalanced by the accompanying decrease in the restoring force. As a result, the piston is moved back and forth with changes in the compressor inlet temperature and always disposed in a position precisely corresponding to the prevailing temperature.

Computation of Limit Fuel Flows

The movements of the piston rods 145 and 193 corresponding to the air temperature and engine speed and the motion of the piston 170 corresponding to the prevailing CDP are combined in the same manner as in the former control and the resultant position at any time of a point 194 corresponds to the desired rate of delivery of fuel at the prevailing speed, variation in such desired maximum flow rate with change in engine speed being represented by the curve $x$ (FIG. 9). The point 194 is on the end of a link 195 whose other end is pivoted at 196 intermediate the ends of a floating lever 197 carrying at one end the slidable follower of an open face cam 198. The latter is fast on a shaft 199 carrying a pinion meshing with rack teeth 200 on the piston rod 174. Near its other end, the lever 197 carries the follower 201 of a cam 202 fast on a shaft 203 coupled to the rod 193 which is journaled in the casing 15 for axial sliding in accordance with the changing values of temperature as measured by the bulb 175. For this purpose, the shaft extends into the cylinder 176 and carries the piston 177 of the temperature senser 126. Through a rack and pinion 204, the shaft is turned back and forth in accordance with changes in the turbine speed measured by the tachometer 128. The connections are such that the shaft 193 is moved angularly and axially with increases in engine speed and air temperatures as indicated by the arrows and the cam 198 is similarly turned as CDP increases.

The cam 202 is of the three dimensional type and thus adapted to convert the axial and angular motions of the shaft 193 into a resultant perpendicular motion of the follower 201 whose position at any time corresponds to the logarithm of $$\frac{Wf}{CDP}$$

where $Wf$ is the weight of fuel capable of being consumed efficiently by the prime mover in a unit interval at given values of speed, air temperature, and CDP. The cam 198 is shaped to position its follower in accordance with the logarithm of CDP. By properly spacing the point 196 from the followers, the two logarithms are added by the lever 197 which is the equivalent of multiplying $$\frac{Wf}{CDP}$$

and CDP. The resultant motion of the point 196 is thus a function of $Wf$ or the maximum fuel flow correct for the speed, temperature and pressure values corresponding to the points on the cams 198 and 202 being contacted at the time.

Figure 8:
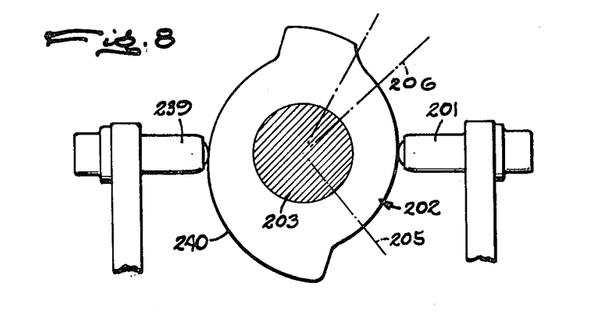
FIG. 8 is a fragmentary section taken along the line 8—8 of FIG. 4.

The ratio of the gearing 204 is such that the shaft 203 turns less than a half revolution over the full speed range of the turbine so that only half of the peripheral surface of the cam 202 is used in computing the fuel limits. Thus, as shown in FIG. 8, the follower 201 is engageable with the cam surface within a range between points 205 and 206 which correspond to minimum and maximum speeds of the prime mover.

As in the former control, the desired or theoretical fuel flow thus computed is compared with prevailing actual fuel flow to determine the points c and d (FIG. 9) at which the supervisory controls become effective to disable the governor 85 and limit the fuel flow through the main valve 10. Herein, the comparison is made by a lever 207 pivotally supported intermediate its ends at the point 194 on the link 195 and carrying at one end a roller 208 which rides the periphery of an open face cam 209. The latter is fast on a shaft journaled in the casing and carrying a pinion 210 which meshes with rack teeth on the outer end of the rod 27 of the fuel valve servo 24.

The contour of the cam 209 is determined by the shape of the valve port 30 and is so designed that the follower 208 moves along a line generally parallel to the motion of the point 194 in accordance with the logarithm of the actual flow of fuel through the valve 10. In this way, the other end 210 of the lever 207 is positioned in accordance with the differences in the logarithms represented by the points 194 and 208 or in other words with the deviation of the actual fuel flow from the flow which would, under the prevailing ambient conditions, reproduce the desired curve x.

*Imposing Computed Flow Limits*

The motion of the output end 210 of the comparing lever 207 is utilized to transfer the control of the fuel valve 10 back and forth between the primary and supervisory controllers at the proper times. In accordance with the present invention, this is accomplished by interposing the limit valve 87 mentioned above in the fluid supply and return lines leading to the governor valve 86 and arranging the limit valve to connect the respective lines 90, 91 to the high and low pressure sources Pc and Pb during steady state operation of the turbine, to interrupt the respective connections when the fuel flow reaches the computed limits, and to reverse the connections and thereby override the governor in the proper direction when the flow exceeds either computed limit.

Figure 2:
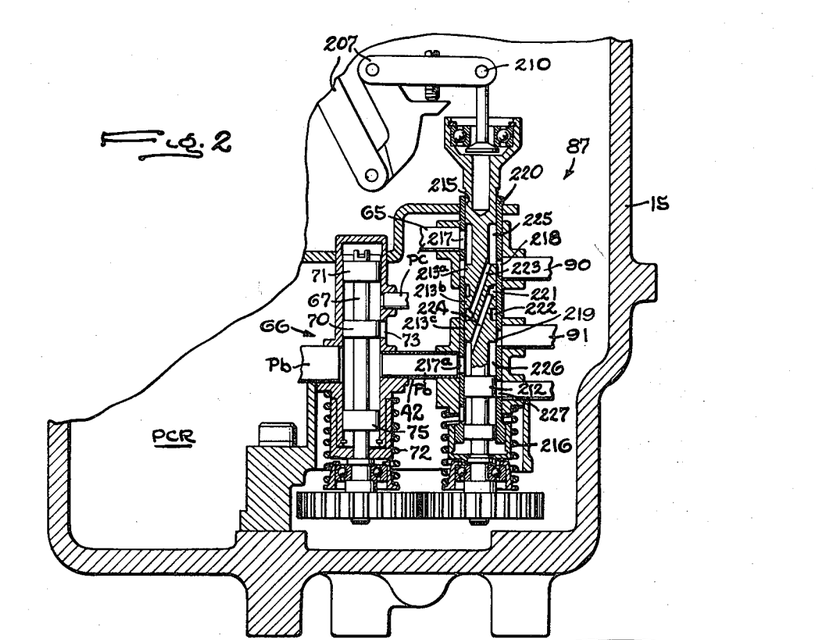
FIGS. 2 and 3 are fragmentary sections taken approximately along the lines 2—2 and 3—3 of FIG. 1 showing the actual size and arrangement of the parts as used commercially.

Preferably, the limit valve is of the sliding land type, its configuration in the commercial form of the control being shown in FIG. 2. The valve comprising the stem 88 is pivotally joined to the end 210 of the lever and carriers three lands 212, 213 and 214 slidable in a cylinder 215 along which the plunger is urged by a spring 216 in a direction to hold the followers against the cams. A port 217a in the cylinder between the lands is continuously connected to the low pressure Pb or fluid return passage 42. The high pressure Pc passage 65 leads to a port 217 which opens into the valve cylinder and like the port 217a is uncovered in all positions of the valve plunger 88. The ends of the passages 90 and 91 leading to the governor valve 86 terminate in ports 218 and 219 opening into and spaced along the cylinder 215 so as to be partially and equally covered by the intermediate land 213 when the valve plunger 88 is in the centered position shown in FIGS. 2 and 4.

Figure 5:
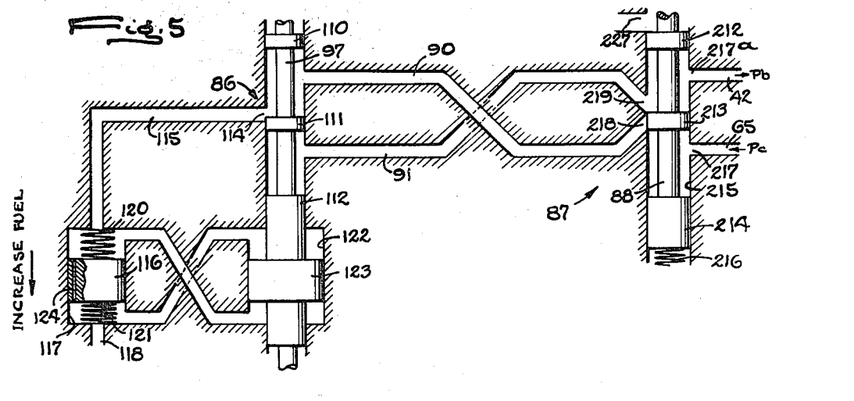
FIGS. 5, 6 and 7 are fragmentary views of a part of FIG. 4 showing different positions of the governor and limit control valves.
Figure 6:
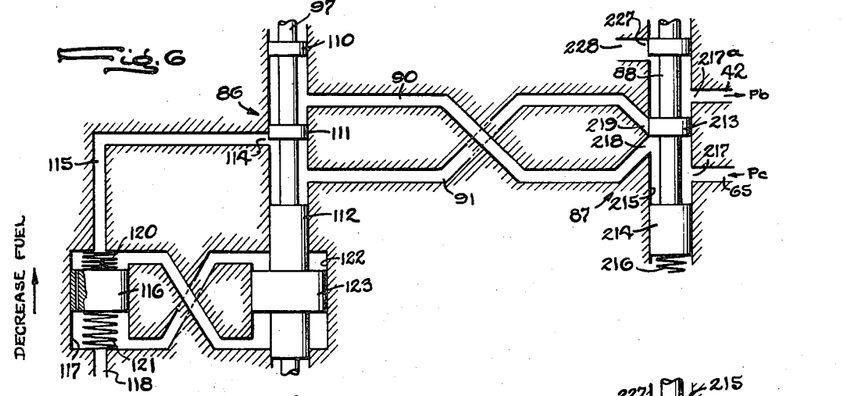
Figure 7:
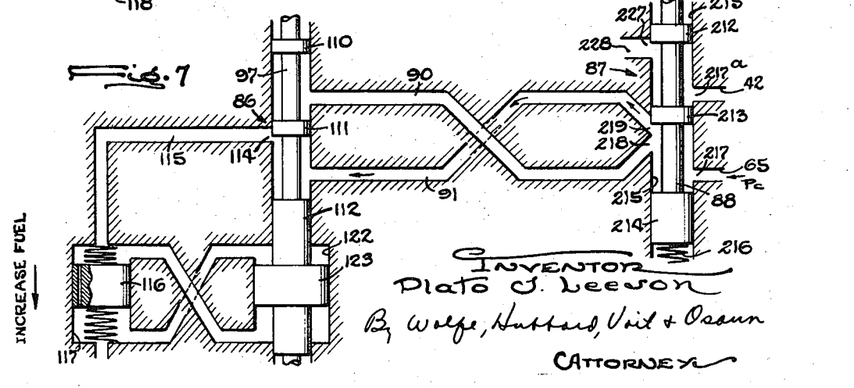

The ports 218 and 219 are so spaced in relation to the length of the land 213 that the port 218 is completely covered by the land as shown in FIG. 5 when the plunger 88 is axially moved in the fuel-increasing direction and becomes spaced from the centered position and disposed in a position corresponding to the maximum fuel limit computed from the prevailing parameter values. Conversely, when the fuel flow is decreasing during deceleration of the turbine toward the computed minimum limit, the valve plunger will be moved axially in the opposite direction, the port 219 being completely covered by the land 213 as shown in FIG. 6 when the flow is reduced to the computed minimum limit then prevailing. Movement of the plunger outwardly beyond either of these blocking positions (FIGS. 5 and 6) will uncover the inner edge of the previously blocked port as shown in FIG. 7 and, as later described in detail, reverse the connection between such port and the high and low pressure passages Pc and Pb.

For convenience in manufacture, the limit valve 87 is preferably constructed as shown in FIG. 2, the parts corresponding to those thus far described bearing the same reference numerals. The cylinder 215 and the ports 217 to 219 therein are formed by a sleeve 220 pressed into a bore in the casing 15 with the ports registering with the ends of the proper passages 42, 65, 90 and 91. To facilitate reversing of the supply and return connections, the land 213 is elongated and divided into three axially spaced parts 213a, 213b and 213c with annular grooves 221 and 222 on opposite sides of the intermediate land 213b continuously connected through diagonally extending bores 223 and 224 with the spaces 225 and 226 which communicate continuously with the high and low pressure passages 65 and 42. The grooves 225 and 226 are so located as to come opposite and at least partially uncover the ports 218 and 219 as above described when the valve plunger is disposed outwardly beyond the maximum and minimum positions respectively.

The land 212 of the limit valve may be utilized to perform an additional function in the case of gas turbines in which it is desirable to regulate the fuel flow in response to a single parameter such as compressor discharge pressure when the fuel flow approaches or exceeds one of the permissible limits, the minimum limit in this instance computed in the manner above described. For this purpose, the land 212 cooperates with the port 227 to maintain the same uncovered as shown in FIG. 4 during steady state operation, to start to uncover the port when the valve plunger 88 approaches and is near the minimum limit position as shown in FIG. 6, and to continue the uncovering of the port as shown in FIG. 7 as the flow continues to decrease beyond such limit.

The port 227 communicates with a passage 228 leading to the rod end of a cylinder 229 in which a piston 230 slides and is urged by a spring 231 toward the head end of the cylinder against the case pressure Pcr to which the head end of the cylinder is exposed. During steady state operation and when the limit valve 87 is positioned as shown in FIGS. 4 and 5, the rod end of the cylinder 229 is also at the case pressure Pcr by virtue of the opening of the valve cylinder 215 outwardly beyond the land 212. Thus, the servo 229, 230 is normally energized so that its piston is held at the head end of its cylinder (FIG. 4). When the land 212 moves outwardly beyond the port 227 (FIG. 6), the servo is deenergized by virtue of its connection to the low pressure Pb, the biasing pressure Pcr then overcoming the spring 231 and the pressure Pb to move the piston rod 232 and rock a lever 233 clockwise about its fulcrum 234. In this movement, the lever engages a hook 235 on the lever 197 and carries the follower 201 away from the 3D cam 202. The part of the limit computing mechanism controlled by the speed and air temperature parameters is thus disabled and the minimum fuel limit is then determined by CDP alone.

When the fuel flow to the turbine as controlled by CDP acting through the limit valve of fuel flow has been increased above the minimum limit, the plunger 88 of the limit valve will have moved reversely to carry the land 212 past the port 227 thus reconnecting the servo cylinder 229 to the case pressure Pcr. This reenergizes the servo allowing the follower 201 to return to normal position against the 3D cam thus returning the limit valve to the control of all three of the limit determining parameters.

*Steady State Operation*

By virtue of the connection of the limit valve 87 and the governor valve 86 in successive series in the pressure line 90 and 91, each valve is adapted to control the energization of the fuel valve servo 24. Under steady state conditions, that is, when the actual fuel flow is between the computed maximum and minimum limits, the land 213 is disposed between the ports 218 and 219 either completely or partially uncovering both. In this condition, the limit valve is inactive and merely serves to connect the lines at the high and low pressures Pc and Pb respectively to the passages 90 and 91 leading to the governor valve. The latter thus acts in the normal way above described to regulate the flow of pressure fluid to and from the cylinder 117 and therefore to the cylinder 28, thus adjusting the energization of the main valve servo and the fuel flow to correct for speed changes detected by the governor. During such action, the hydraulic compensating system including the pistons 116 and 123 maintains true isochronous operation, that is, constant speed of the turbine at a value determined by the existing setting of the governor speeder spring 101.

Operation at and Beyond Maximum Computed Fuel Limit

When, during acceleration of the turbine, the fuel flow increases as the maximum permissible value as computed from existing ambient parameters, the limit valve 87 will reach the position shown in FIG. 5 in which the port 218 is completely covered by the land 213. At this time, the governor speed setting will be unsatisfied and the land 111 of the valve 86 will be disposed below the port 114 as the governor tries to increase the fuel flow. Such increase is prevented by the closure of the port 218 by the land 213 thus preventing the flow of high pressure $Pc$ fluid to the passage 90.

Now, if the ambient parameters are such as to reduce the permissible fuel flow below the existing actual flow, the plunger 88 of the limit valve will be moved beyond the blocking position FIG. 5 thus uncovering the inner edge of the port 218. This reverses the normal connection between the low pressure line 42 and the passages 90 and 91 and connectes both of the passages to the low pressure $Pb$ line 42. Pressure fluid is thus released from the cylinder 117 and therefore the servo cylinder 28 allows the fuel valve piston to move under its hydraulic bias and decrease the flow through the valve 10. It will be observed that the governor valve 86 is properly conditioned at this time to permit such flow, the land 111 being disposed below the port 114 because the governor speed setting remains unsatisfied.

Operation at and Beyond Minimum Computed Fuel Limit

When, during deceleration of the turbine in response to a decrease in the stress of the governor speeder spring 101, the fuel flow is reduced by action of the governor to a rate just short of permissible minimum limit computed by the three parameters, the port 227 will be uncovered by the land 212 thus transferring the control of the computer to CDP alone as described above. When the fuel flow is reduced to the minimum permissible limit determined by CDP, the plunger 88 of the limit valve 87 will be moved to the position shown in FIG. 6 in which the land 213 completely covers the port 219. At the time, the governor will be trying to reduce the fuel flow and therefore its land 111 will be disposed above the port 114. The low pressure $Pb$ line will thus be disconnected from the passage 91 thereby preventing the further escape of fluid from the servo cylinder 28 and a consequent further reduction in the fule flow as called for by the governor.

Now, if the ambient parameters change so as to compute a minimum permissible flow greater than the actual flow then existing, the valve plunger 88 will be moved to carry the land 213 across the port 219 as shown in FIG. 7. This connects the high pressure $Pc$ line to the passage 91 allowing high pressure fluid to flow as indicated by the arrows through the governor valve 86 and to the cylinder 117 thereby increasing the pressure in the servo cylinder 28 so as to open the valve 10 and admit more fuel to the turbine. The action of the governor, which is then calling for less fuel, is thus overridden and the fuel flow is increased under the control of the limit valve 87 in spite of the fact that the governor is calling for less fuel.

With the valve plunger 88 at the ocmputed minimum limit as shown in FIG. 6, the port 227 will be partially uncovered thereby connecting the low pressure line to the passage 228 leading to the servo cylinder 229. The release of pressure fluid from the latter allows the bias pressure $Pcr$ on the piston 230 to move the latter as described above and rock the lever 197 to retract the follower 201 away from the 3D cam. The limit valve is thus placed under the sole control of the CDP while the actual fuel flow is near or below the computed minimum limit. When the minimum computed fuel limit has again been exceeded, fluid at the case pressure $Pcr$ will again be admitted to the rod end of the servo 229, 230 and coact with the spring 231 to move the piston 230 and its rod 232 away from the lever 233 thus restoring normal operation of the computer under the control of the three parameters.

By using the valve 212, 227 directly to control the servo 229, 230, the transfer of the computer control from three parameters to one parameter and vice versa is controlled more accurately than has been possible heretofore.

It will be observed that the elements, including the buffer piston 116 and its springs 120, 121, and the receiving piston 123 on the governor valve stem, which form the so-called compensating system for modifying the fly-weight action and produce isochronous operation of the turbine under steady state conditions do not interfere with the action of the valve 87 in limiting or overriding the action of the governor 85. Thus, as illustrated in FIG. 7, the increased pressure in the outer end of the cylinder 122 when the governor is being overridden by the action of the limit valve produces a pressure differential which acts on the compensating receiving piston 123 in a direction to supplement the governor action and induce further uncovering of the port 114.

Advantages of Series Arrangement of Governor and Limit Valves

By interposing the limit valve 87 in series with the governor valve 86 and in advance of the latter, the hydraulic system between the govenor valve and the main valve servo is maintained completely closed and not subject to the escape of pressure fluid by leakage such as may occur past the lands of the limit valve. As a result, the position of the servo piston 25 is controlled solely by the governor during steady state operation when precise positioning according to the turbine speed is important. In other words, any leakage of fluid out of the system short of the governor valve 86 during steady state operation has no effect on the accuracy with which the governor controls the rate of fuel delivery. Also, the desired limiting and overriding action is achieved by a valving action as contrasted with the application of forces for overpowering the main servo. As a consequence, the desired action is produced by parts of minimum size and weight and better adapted to provide accurate control of the fuel flow under the limit conditions.

Continuing Operation After Fuel Shut-Off

Figure 1:
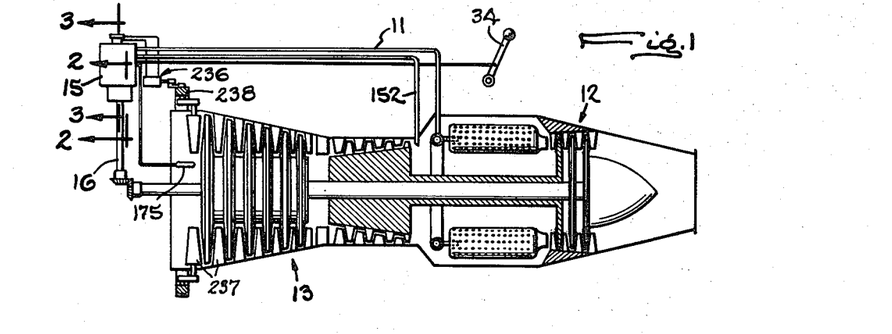
FIGURE 1 is a diagrammatic view of a gas turbine type of prime mover equipped with a fuel regulator embodying the novel features of the present invention.

Optimum operating efficiency is achieved in certain aircraft gas turbines by adjusting the stator vanes 237 (FIG. 1) continuously in accordance with a schedule computed from the same parameters that are used in determining the fuel limits as above described. This has been accomplished by a separate hydraulic servo 236 coupled to the vane adjusting ring 238 and controlled by a pilot valve which is actuated by a follower 239 bearing against the surface 240 of a 3D cam fast on the shaft 203. Herein, the surface 240 (FIGS. 4 and 8) is formed by the other half portion of the cam 202 and is contoured angularly and longitudinally to produce the desired positioning schedule for the vanes 237.

To enable the vanes 237 to be positioned properly for restarting of the turbine after the fuel has been shut off by closure of the valve 31, provision is made in the present instance for automatically loading the metering head regulator valve 37 so as to provide a continued source of fluid pressure for operating the various servos as when the compressor is windmilling while the fuel is shut off. For this purpose, the valve 48 above mentioned is coupled to the stem 32ᵃ of the fuel shut-off valve 31 and adapted upon manual closure of this valve to provide a continuous and regulated pressure in the space 47 of the valve 44 normally controlling the main by-pass valve 37.

To these ends, the valve 48 (see FIG. 10) includes a cup-shaped member 241 slidable in a cylinder 242 and abutting at one end against a shoulder 242ᵃ and at the other end against one end of a compression spring 243 which normally holds a member 244 against a seat 245 thus closing the valve formed by this member and the end of a passage 260 communicating with the interior of the casing at the pressure P$cr$. The member 244 is disposed within a chamber 246 communicating with the interior of the cup 241 through a restriction 247 and thus normally maintained at the pressure P2. At this time, a port 261 in the side of the cup 241 registers with a port 248 communicating with the fuel valve outlet 30.

The valve member 244 is urged toward closed position (FIG. 10) by a spring 249 encircling the stem 250 whose end is coupled as through a link 251 to a lever 252. The latter is fulcrumed at 253 within the casing and pivoted at its free end on the stem 32ᵃ on the fuel shut-off valve 31.

Figure 10:
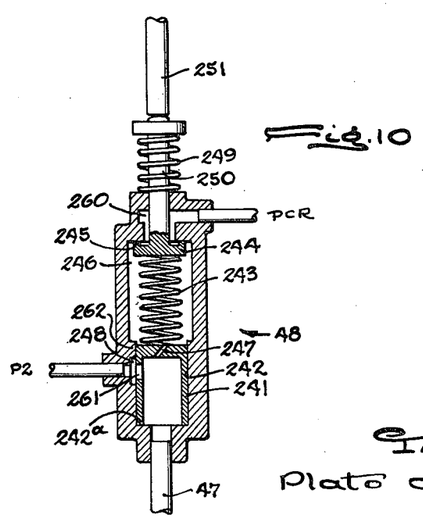
FIG. 10 is a longitudinal sectional view of one of the pressure regulating valves.

During normal operation of the turbine, the parts of the valve 48 will be positioned as shown in FIG. 10, the chamber 246 then being at the pressure P2 as the valve 37 operates automatically as above described to maintain the desired constant pressure drop across the main fuel valve 10. Now, when the valve 31 is closed to shut off the fuel supply to the turbine burners, the stem 250 is moved by the lever 252 and the member 244 is moved off of the seat 245 thus connecting the space 246 to the lower case pressure P$cr$. As a result, the cup 241 is moved away from its seat and against the spring 243 so that the port 261 cooperates with the land 262 to regulate the flow of fluid from the fuel valve outlet 30 then at the pump discharge pressure P1 through the cup 241 and to the space 47. The latter is thus maintained at a pressure equal to P$cr$ plus the force of the spring 243. As a consequence, the by-pass valve 44 is operated as before to maintain a constant pressure drop across the fuel valve 10 thus making available to the various pressure regulators 57, 66 and 76, a high pressure source as needed for continuing the operation of the temperature and pressure sensers 126 and 127 even though the shut-off valve 31 remains closed. The turbine controls are thus maintained in readiness for restarting the turbine whenever desired.

When the shut-off valve 31 is again opened by the throttle lever, the valve member 244 is reseated and, by leakage of fluid into the chamber 246 through the restriction 247, the normal position of the cup 241 is restored.

*Modification of Servo Action Compensate for Temperature Changes*

In hydraulic servos of the character above described, it will be observed that the precision achieved in positioning the driven part depends on the accuracy with which the restoring force is proportioned by the spring in the follow-up connection. Herein, the restoring springs 141, 171 and 189 are immersed in fluid within the casing 15 at a temperature which may vary widely in service use especially on aircraft turbines. Such variations change the modulus of the restoring springs when constructed of standard spring metals.

In another of its aspects, the invention contemplates compensating automatically for such modulus changes by transmitting the spring force back to the control valve through a connection whose motion ratio is adjusted automatically and in the proper direction by a thermostatic element 255 in the case of the tachometer 128 also submerged in the casing fluid. Herein, this element is a strip of bimetal bent into a U-shape with one end anchored at 256 to the casing. The other end is coupled to a pin 257 guided in the casing for endwise sliding and carrying a roller which provides the fulcrum 144.

The variable ratio connection is formed by the lever 143 which parallels the pin 257 and bears at opposite ends against the spring 141 and the valve stem 133. In view of the positive coefficient of expansion possessed by ordinary spring metal, the bimetal strip 255 is arranged to move the fulcrum 144 away from the spring 141 as the fluid temperature increases thus causing the spring to act at a correspondingly greater mechanical advantage. The ratio change as determined by the length of the bimetal strip is made to match the spring so as to provide the desired accuracy in the compensation.

*Use of Case Pressure for Servo Biasing*

It will be observed that the cylinders of several of the hydraulic servos are left open at one end, and the full diameter of the piston slidable therein is thus exposed to the case pressure P$cr$. Since this pressure is maintained as above described at a value intermediate low and high control pressures P$b$ and P$c$, it is used advantageously in providing the force for biasing each piston in one direction. This avoids the necessity of providing differential areas on the pistons and the additional hydraulic connections thereby involved. As a result, the control is greatly simplified in construction and a high degree of compactness in the arrangement of the parts within the case is achieved.

I claim as my invention:

1. For use in regulating the flow of fuel to a prime mover, the combination of, a main flow regulating valve, a hydraulic actuator for said valve including a cylinder and a piston slidable therein to open and close said valve with changes in the pressure in the cylinder, means providing sources of fluid at relatively high and low pressures, first and second fluid filled passages, a first control valve communicating with one end of said first and second passages and controlling the flow of fluid through said passages to and from said cylinder including a member movable to block said flow when in a centered position and to connect said first and second passages respectively to the cylinder when the member is disposed on opposite sides of such centered position, a selectively adjustable speed senser actuating said member to dispose the same in said centered position when the detected speed corresponds to the speed setting of the senser and on opposite sides of such position when the speed deviates in opposite directions from such setting, a second control valve communicating with the opposite ends of said passages and with said pressure sources and having a movable element adapted to connect said first and second passages to said high and low pressures respectively when in a central position and to block the respective passages when disposed in positions adjacent and on opposite sides of such central position, said second control valve acting when moved in one direction beyond said blocking positions to connect both of said passages to said low pressure source and to said high pressure source when disposed beyond said blocking positions in the opposite direction, mechanism for measuring at least one condition affecting the operation of a prime mover and computing permissible maximum and minimum limits of fuel flow, and means continuously comparing the prevailing actual flow of fuel through said main valve with the output of said computing mechanism and positioning said control element in accordance with the difference between the actual fuel flow and the computed permissible limit whereby to maintain the element between said blocking positions when the actual flow of fuel is between said limits and in the respective blocking positions when such actual flow is at said maximum and minimum limits respectively.

2. For use in regulating the flow of fuel to a prime mover, the combination of, a main flow regulating valve, a hydraulic actuator for said valve including a cylinder and a piston slidable therein to open and close said valve with changes in the pressure in the cylinder, means providing sources of fluid at relatively high and low pressures, first and second fluid filled passages, a first control valve communicating with one end of said first and second passages and controlling the flow of fluid through said passages to and from said cylinder including a member movable to block said flow when in a centered position and to connect said first and second passages respectively to the cylinder when the member is disposed on opposite sides of such centered position, a selectively adjustable speed senser actuating said member to dispose the same in said centered position when the detected speed corresponds to the speed setting of the senser and on opposite sides of such position when the speed deviates in opposite directions from such setting, a second control valve communicating with the opposite ends of said passages and with said pressure sources and having a movable element adapted to connect said first and second passages to said high and low pressures respectively when in a central position and to block the respective passages when disposed in positions adjacent and on opposite sides of such central position, mechanism for measuring at least one condition affecting the operation of a prime mover and computing permissible maximum and minimum limits of fuel flow, and means continuously comparing the prevailing actual flow of fuel through said main valve with the output of said computing mechanism and positioning said control element in accordance with the difference between the actual fuel flow and the computed permissible limit whereby to maintain the element between said blocking positions when the actual flow of fuel is between said limits and in the respective blocking positions when such actual flow is at said maximum and minimum limits respectively.

3. For use in regulating the flow of fuel to a prime mover, the combination of, a main flow regulating valve, a hydraulic actuator for said valve including a cylinder and a piston slidable therein to open and close said valve with changes in the pressure in the cylinder, means providing sources of fluid at relatively high and low pressures, first and second fluid filled passages, a first control valve communicating with one end of said first and second passages and controlling the flow of fluid through said passages to and from said cylinder including a member movable to block said flow when in a centered position and to connect said first and second passages respectively to the cylinder when the member is disposed on opposite sides of such centered position, a selectively adjustable speed senser actuating said member to dispose the same in said centered position when the detected speed corresponds to the speed setting of the senser and on opposite sides of such position when the speed deviates in opposite directions from such setting, a second control valve communicating with the opposite ends of said passages and with said pressure sources and having a movable element adapted to connect said first and second passages to said high and low pressures respectively when in a central position and to block one of said passages when disposed in a position but offset to one direction from such central position, said second control valve acting when moved in said one direction beyond said blocking positions to connect both of said passages to one of said pressure sources, mechanism for measuring at least one condition affecting the operation of a prime mover and computing permissible limit of fuel flow, and means continuously comparing the prevailing actual flow of fuel through said main valve with the output of said computing mechanism and positioning said control element in accordance with the difference between the actual fuel flow and the computed permissible limit whereby to maintain the element near said central position when the actual flow of fuel is short of said limit and in the blocking position when such actual flow is at such limit.

4. For use in regulating the flow of fuel to a prime mover, the combination of, a main flow regulating valve, a hydraulic actuator for said valve including a cylinder and a piston slidable therein to open and close said valve with changes in the pressure in the cylinder, means providing sources of fluid at relatively high and lower pressures, first and second fluid filled passages, a first control valve communicating with one end of said first and second passages and controlling the flow of fluid through said passages to and from said cylinder including a member movable to block said flow when in a centered position and to connect said first and second passages respectively to the cylinder when the member is disposed on opposite sides of such centered position, a selectively adjustable speed senser actuating said member to dispose the same in said centered position when the detected speed corresponds to the speed setting of the senser and on opposite sides of such position when the speed deviates in opposite directions from such setting, a second control valve communicating with the opposite ends of said passages and with said pressure sources and having a movable element adapted to connect said first and second passages to said high and low pressures respectively when in a central position and to block one of said passages when disposed in a position but offset to one direction from such central position, mechanism for measuring at least one condition affecting the operation of a prime mover and computing permissible limit of fuel flow, and means continuously comparing the prevailing actual flow of fuel through said main valve with the output of said computing mechanism and positioning said control element in accordance with the difference between the actual fuel flow and the computed permissible limit whereby to maintain the element near said central position when the actual flow of fuel is short of said limit and in the blocking position when such actual flow is at such limit.

5. For use in regulating the flow of fuel to a prime mover, the combination of, a main fuel valve, a hydraulic actuator including a cylinder and a piston slidable therein to open and close said valve with changes in the pressure in the cylinder, means providing sources of fluid and relatively high and low pressures, a selectively adjustable speed senser having a governor control valve regulating the flow of fluid to and from said cylinder, a second control valve interposed in series between said pressure sources and said governor valve having an element movable between maximum and minimum limit positions and adapted when in such positions to interrupt the connection between said governor valve and one of said pressure sources, devices for sensing changes in conditions of speed and air temperature and pressure, a system normally adjusted by each of said devices and computing maximum and minimum limits of a permissible range of fuel flow for each prevailing set of conditions, mechanism controlled by said system and actuating said control valve element to dispose the same in said maximum limit position when the fuel flow through said main valve reaches the permissible computed limit during periods of acceleration, an auxiliary fluid servo adapted when rendered active to withdraw said speed and temperature sensing devices from the control of said system and leave the latter within the sole control of said pressure sensing device, and a third control valve actuated by said control valve element to activate said auxiliary servo when the flow through said fuel valve decreases substantially to said minimum limit during a period of deceleration.

6. For use in regulating the flow of fuel to a prime mover, the combination of, a main flow regulating valve, a hydraulic actuator for said valve including a cylinder and a piston slidable therein to open and close said valve with changes in the pressure in the cylinder, a single fluid filled hydraulic system communicating with said cylinder, two parallel fluid filled passages, means providing sources of fluid at relatively high and low pressures, a selectively adjustable all-speed governor including a valve operable to connect one end of the respective passages to said system in response to increases and decreases in the governor speed above and below its speed setting, both of said passages being disconnected from said system when the governor is on-speed, a valve at the other ends of said passages including a movable element adapted when disposed within a central range to connect said passages with said high and low pressures respectively and when disposed at opposite limits of said range to disconnect one or the other of said passages from its associated pressure source and thereby block a further flow of fluid in said hydraulic system as called for by said governor, and mechanism for measuring at least one condition affecting the operation of a prime mover and computing permissible maximum and minimum limits of fuel flow, and means continuously comparing the prevailing actual flow of fuel through said main valve with the output of said computing mechanism and positioning said control element in accordance with the difference between the actual fuel flow and the computed permissible limit whereby to maintain the element within said central range when the actual flow of fuel is between said limits and in the respective blocking positions when such actual flow is at said maximum and minimum limits respectively.

7. A fuel regulator as defined in claim 6 in which isochronous operation of said governor is produced by a hydraulic compensating system including a cylinder interposed in said first hydraulic system, a piston slidable therein, and means providing a passage permitting a restricted flow of fluid between opposite ends of the compensating cylinder.

8. For use in regulating the flow of fuel to a prime mover, the combination of, a line for conducting fuel to a prime mover, a main valve interposed therein and having inlet and outlet passages and a member movable back and forth to vary the valve opening, a pressure responsive hydraulic actuator coupled to said member to position the latter in accordance with the pressure energizing the actuator, a system for controlling the energization of said actuator including a selectively adjustable speed governor and mechanism for imposing a limit on the action thereof, a fuel shut-off valve interposed in said line downstream from said main valve, manually operable means for moving said shut-off valve between open and closed positions, a passage communicating with said valve inlet and supplied with fuel at a variable high pressure, a valve for by-passing fuel out of said supply passage to vary the pressure drop across the valve opening, a hydraulic servo for actuating said by-pass valve, valve means responsive to the pressure in said inlet and outlet and regulating the energization of said actuator to maintain a constant pressure drop across said main valve opening while said shut-off valve is open, a normally inactive auxiliary valve coupled to said shut-off valve and rendered operative automatically by closure of said shut-off valve, said last mentioned valve acting, when rendered operative to regulate the energization of said servo and maintain a substantially constant pressure in said supply passage, and a source of fluid at a lower pressure than said fuel supply source, said valve means includes a pilot valve controlling the flow of fluid to and from said by-pass valve servo, said pilot valve comprising a spring loaded plunger and chambers at opposite ends thereof continuously communicating with said inlet and said outlet respectively, and said auxiliary valve having a spring loaded plunger subjected to said lower pressure source when said shut-off valve is closed and acting to vary the area of the opening between said main valve outlet and the lower pressure chamber of said first plunger.

References Cited in the file of this patent
UNITED STATES PATENTS

| | | |
|---|---|---|
| 1,460,586 | Howse | July 3, 1923 |
| 2,645,293 | Ogle | July 14, 1953 |
| 2,765,800 | Drake | Oct. 9, 1956 |
| 2,857,741 | Evers | Oct. 28, 1958 |
| 2,879,643 | Stroh | Mar. 31, 1959 |
| 2,906,093 | Robinson | Sept. 29, 1959 |
| 2,926,494 | Farkas | Mar. 1, 1960 |
| 2,957,488 | Farkas | Oct. 25, 1960 |
| 2,968,283 | Hilker | Jan. 17, 1961 |
| 3,005,464 | Huckins | Oct. 24, 1961 |
| 3,019,602 | Plummer | Feb. 6, 1962 |